March 26, 1968 N. GOLDSTERN 3,375,348

RECORD IDENTIFICATION SYSTEM AND METHOD

Filed Feb. 8, 1963

United States Patent Office 3,375,348

Patented Mar. 26, 1968

3,375,348

RECORD IDENTIFICATION SYSTEM AND METHOD

Norbert Goldstern, Spoorlaan 30, Tilburg, Netherlands

Filed Feb. 8, 1963, Ser. No. 257,265
Claims priority, application Germany, Feb. 16, 1962, G 34,282
7 Claims. (Cl. 235—61.11)

Figure 1:
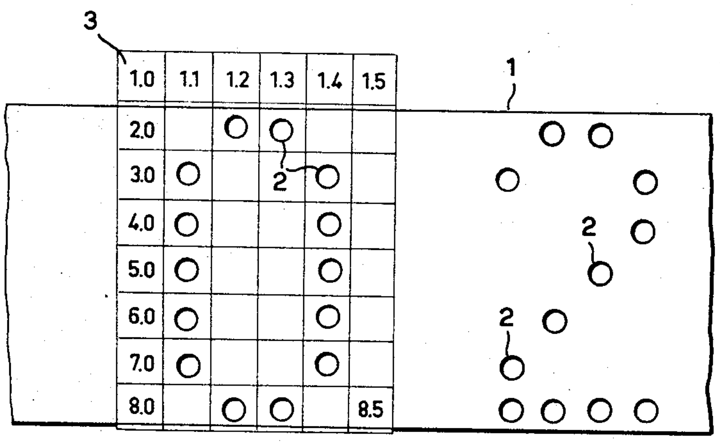

My United States Patent 2,944,735 discloses a registration record in the form of cards, sheets, bands, slips and the like with visually legible characters, the optically active surface of which defines the identity of the character, for information handling machines or devices in which the characters as a whole are photo-electrically scanned in a single scanning operation, which record consists of different numbers of equally large perforations.

The purpose of the invention is to provide an improvement of the prior art registration record such that the possibilities for transmitting different characters are increased so as to allow nearly any supply of characters to be transmitted.

Moreover the purpose of the invention is to provide the possibility of equal distribution of the signal-values assigned to the different characters. In accordance with the device of the above-mentioned patent, the characters differ only as to the number of perforations. The perforations of the patent are of equal size and are arranged in the form of visually legible characters. Consequently the signal-value is proportional to the number of perforations of the character. However, on one hand, owing to the size limitations of the characters, the number of perforations constituting the individual characters is limited whereas, on the other hand, because of problems of legibility, the number of perforations constituting individual characters cannot be too small and thus only a restricted number of perforations are available for forming the characters.

The invention enables an increase of the supply of characters transmissible generally through an enlargement of the differences between the individual signal-values issued by the various characters. In accordance with the invention the perforations are arranged with respect to a surface distribution arrangement of a number of scanning photo-electric cells or other radiation sensitive elements, which differ in sensitivity.

For reading or handling the information contained in a registration record according to the invention one can use a method carried out in such a way that the registration record with its perforation forming the character to be transmitted, is laid on a divided plane containing photo-electric scanning cells or other radiation sensitive elements of different sensitivity. The signal-values issued in accordance with the particular elements exposed to light passing through corresponding perforations are made to act upon controlling means known per se. The means may, for example, comprise relays, by cooperation of which the character transmitted is identified and/or handled. Identification and/or handling may involve methods wherein the character is put to print or to another representation, reproduction or forwarded in uncoded or coded form, or used in controlling effects of all kinds, corresponding with the character, e.g., controls of guiding or working elements for working, processing, guiding, or forwarding devices for all kinds of goods worked up or to be processed.

Figure 2:
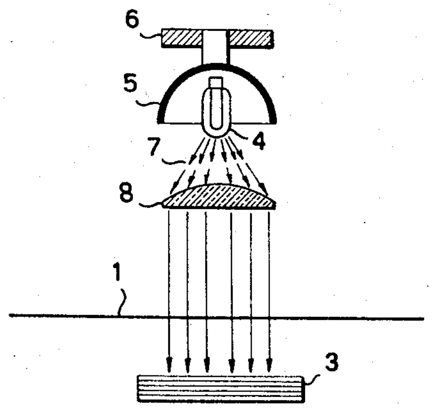

The invention further concerns a device for practising the above mentioned method, which device contains a number of photoelectric cells or other radiation sensitive elements each having a different sensitivity, mounted for being exposed to irradiation by one or more light or other appropriate radiation sources and connected to controlling means as set forth hereinbefore. Further details of the invention will appear from the following description and the accompanying drawing. The latter shows:

FIG. 1 a top-view of the registration record as per the invention in cooperating with the photo-electric cells or other radiation sensitive elements arranged in grid like structure and FIG. 2 a side-view of the device for identifying and utilizing the information contained in a registration record embodied as per the invention, schematically represented.

The registration record 1 consisting of a card, sheet, slip, band or the like with the perforations 2 arranged therein in the form of a visually legible character, which for the embodiment shown in FIG. 1 is the character 0. As shown, 14 perforations 2 are used in forming the character. The perforations are arranged on the registration record 1 such way that each perforation is assigned to a photo-electric cell 3 or another radiation sensitive element. The photo-electric cells 3 are arranged in the form of a grid-like surface distribution, the rows of which extending in one direction are, e.g., indicated by 1.0 to 8.0 and the columns of which extending with respect to the rows in a direction, correspondingly by .0 to ·5. In accordance with this arrangement the upper left-hand element is designated by the reference coordinates 1.0 whereas the element in the next to last row and next to last column is designated by the reference coordinates 7.4.

The individual photo-electric cells 3 of the grid like structure differ from each other in sensitivity. For example, photo-electric cells 3 may be employed, which because of differences in the material used in constructing the cells possess different sensitivities.

The required differences of sensitivity of the photo-electric cells 3 may also be achieved by providing baffles of different surface-sizes or filters of different transmissibility or surface-sizes for the individual cells. Through the use of baffles or filters the photo-electric cells 3 may be made to show different sensitivities.

The sensitivity differences of the individual photo-electric cells 3 relative to each other may also be achieved by connecting resistors having different resistance values in series with each of the photo-electric cells 3. Such series connections to each individual photo-eletcric cell and a resistor may then be connected in parallel in a circuit comprising a voltage source and a working-resistor or the like.

As may be seen in FIG. 2, a source of light 4, preferably common for all photo-electric cells 3 of the screen grid, is used to accomplish the exposure of the photo-electric cells 3 disposed under each individual perforation of the registration record 1. The source of light 4 is provided with a reflector 5 and fixed to a holder 6. Rays 7 transmitted by the source of light 4 and intensified by the reflector 5 may be directed in parallel and cast on the registration record 1 so that they may penetrate its perforations 2, irradiating those photo-electric cells which are arranged under corresponding perforations 2.

In the example represented in FIG. 1, the transmission of the character 0 is concerned, accomplished by the exposure of the photo-electric cell areas 2.2; 2.3; 3.4; 4.4; 5.4; 6.4; 7.4; 8.3; 8.2; 7.1; 6.1; 5.5; 4.1; 3.1.

The character 2, to be transmitted as next character of the embodiment represented in FIG. 1 is transmitted in the same way by exposing the photo-electric cell areas 2.2; 2.3; 3.4; 4.5; 5.3; 6.2; 7.1; 8.1; 8.2; 8.3; 8.4.

The sensitivity of photo-electric cells of areas 1.0; 1.1 . . . 8.4; 8.5 need not to be different for all individual photo-electric cell areas. For instance, it is possible to choose the sensitivities of each photo-electric cell area of a group of such areas mutually equal. The photo-electric cells 1.0; 1.1; 1.2; 1.3; 1.4 and 1.5 may e.g. form the first group, the photo-electric cells 2.0; 2.1 . . . 2.5 the second group etc. So a substantial simplification of the complex of photo-electric cells is possible when combining the photo-electric cells 1.0 up to and inclusive 1.5 to one single photo-electric cell, 2.0 . . . 2.5 inclusive to the second photo-electric cell etc. The photo-electric cells 1.0; 2.0 . . . 8.0 could also form a first group, the photo-electric cells 1.1; 2.1 . . . 8.1 the second group etc. In such an embodiment combined elongated photo-electric cells may be employed.

Furthermore it is possible to combine photo-electric cells in a further way in which some elongated photo-electric cells are used. In this arrangement each elongated cell of which comprises a series of elementary photo-electric cell areas and one more series of photo-electric cells is or covered with a number of separate photo-electric cells.

A further possibility is the use of photo-electric cell areas of a different form, e.g. rectangles, such as 1.0; 1.1; 1.2; 2.0; 2.1; 2.2 as first area and 1.3; 1.4; 1.5; 2.3; 2.4; 2.5 as second area etc. Thus in accordance with the invention it is not necessary that a separate photo-electric cell is present for each elementary area that may contain a perforation.

The individual photo-electric cells are connected to control devices e.g. in the embodiment of relays the same way as already indicated for the registration record as per the above mentioned patent. Their cooperation results in the transmission of the character repersented on the registration record. As set forth above a control signal in accordance with the character transmitted can be used to control other elements such as further control or guide means. One such application is in the forwarding and/or handling of mail.

In accordance with the invention, in addition to, the variation of the total photo-current released with each character, the position of the individual perforations result in different effects. By utilizing the photo-currents produced when different photocells of different sensitivities are exposed, a number of decidedly different parameters are provided for reading of the registration record.

Thus in accordance with the present invention the number of various characters one wishes to transmit is made accordingly great without the sacrifice of reliable controlling effects. In this way a number of different variables for the reading and/or handling device are provided.

It is noted that in accordance with the invention the sum of the photo-cell current values need not even be used at all and that further, these values need not be used alone in the identification process but that other controlling effects involving the use of individual or groups of photo-eletcric cells can be used. As stated, by the use of the various techniques described in various combinations the number of working varaibles or parameters is considerably increased. It is further noted that one method of identification may be used as a check on another.

For example, the information gathered from the photo-electric cells each time they are exposed by ascertaining the total strength of the sum photo-current, may be checked by ascertaining the mere number of the perforations irradiated, so that when using the invention a very efficient check can be carried only using the registration and reading method as per the above mentioned patent and vice versa. With the aid of the invention also the possibility exists to take digital advantage of the position of the individual perforations since for each determined position of a photo-electric cell the alternative: "cell excited—cell not excited" is given, whereas in practising the registration record as per the main patent the analog method is used in which only photo-currents of different strength are assigned to the individual characters. The quantities of light reaching the photo-electric cell areas 3 through the individual perforations 2 of the registration record are always of equal size; they are conditioned by the size of the perforation, the quantity of light falling on the individual photo-electric cell area.

With the aid of the invention it is possible to do with a very small number of perforations for each character to be transmitted since only as many perforations are necessary as required to render the character each time to be transmitted still visually perceptible. This, however, may already be achieved with very few perforations. Also this point of view contributes to the possibility of transmitting quite a large supply of characters with the help of the registration record as per the invention.

In view of the foregoing it can be seen that the invention provides for the use of the perforations of a character in three essentially different ways, viz: firstly, the sum of the number of perforations may be utilized in identification; secondly, the sum or another arithmetical junction of the signal-values due to different sensitivities may be utilized; and thirdly, digital-informaiton handling techniques may be utilized. Therefore, it is possible to check independently the results obtained in one approach by another approach. So, obtaining a high degree of reliability with simple means is possible by the invention.

What I claim is:

1. A record identification system employing a record medium having a plurality of mutually equal perforations therein in a visually comprehensible symbol, the record identification sorting system including an array of radiation sensitive devices, said radiation sensitive devices having differing electrical responses whereby record mediums having different symbols with the perforations disposed in different patterns therein produce different electrical responses when radiant energy is passed therethrough onto the array of radiation sensitive devices.

2. A record identification system according to claim 1, wherein the array of radiation sensitive devices comprises a plurality of identical radiation sensitive elements, and means for varying the radiant energy transmitted to the individual elements whereby different elements produce different electrical responses.

3. A record identification system according to claim 2, wherein said last named means comprises filters.

4. A record identification system according to claim 2, wherein said last named means comprises baffles.

5. A record identification system according to claim 1, wherein the array of radiation sensitive devices comprise a plurality of identical radiation elements and circuit means including resistors connected with said radiation elements for transmitting the electrical response to radiant energy, said resistors having different values so that different radiation sensitive devices have different electrical responses.

6. In a method of record identification including perforating record media to produce visually comprehensible information thereon, the perforations being arranged in patterns, passing radiant energy through the perforated record media to an array of radiation sensitive devices, different radiation sensitive devices producing different electrical responses so as to produce a unique electrical signal for each pattern of visually comprehensible information on the record media, the signal differing for different patterns having an identical number of perforations.

7. A record identification system including record media having visually comprehensible information thereon in the form of patterns of perforations, an array of radiation sensitive devices, groups of said devices having different electrical responses from other groups of said devices, whereby when radiant energy is passed through the record media a different electrical signal is produced for each pattern of perforations and different patterns of perforations having the same number of perforations produce different electrical signals.

References Cited

UNITED STATES PATENTS

| | | | |
|---|---|---|---|
| 2,268,498 | 12/1941 | Bryce | 235—61.7 |
| 2,362,004 | 11/1944 | Heidinger | 235—61.6 |
| 2,774,821 | 12/1956 | Brown | 179—18 |
| 2,819,841 | 1/1958 | Blashfield | 235—61.9 |
| 2,944,735 | 7/1960 | Goldstern | 235—61.12 |
| 2,985,366 | 5/1961 | Scarrott | 235—61.11 |
| 3,102,203 | 8/1963 | McNaney | 250—209 |
| 3,104,369 | 9/1963 | Rabinow | 340—146 |
| 3,104,372 | 9/1963 | Rabinow | 340—146 |
| 3,109,065 | 10/1963 | McNaney | 178—30 |
| 3,167,612 | 1/1965 | Strickholm | 178—7.1 |
| 3,205,361 | 9/1965 | Albus | 250—203 |

MAYNARD R. WILBUR, *Primary Examiner.*

DARYL W. COOK, *Examiner.*

J. WALLACE, G. EDWARDS, *Assistant Examiners.*